United States Patent
Karasawa (10) Patent No.: US 7,760,999 B2
(45) Date of Patent: Jul. 20, 2010

(54) IMAGE CAPTURING APPARATUS, CONTROL METHOD THEREOF, PROGRAM, AND STORAGE MEDIUM

(75) Inventor: Akira Karasawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 11/972,438

(22) Filed: Jan. 10, 2008

(65) Prior Publication Data
US 2008/0170850 A1   Jul. 17, 2008

(30) Foreign Application Priority Data
Jan. 15, 2007   (JP) ............................. 2007-006417

(51) Int. Cl.
G03B 7/00 (2006.01)
G03B 7/085 (2006.01)
G03B 7/095 (2006.01)
G03B 9/02 (2006.01)
H04N 5/235 (2006.01)
H04N 5/238 (2006.01)

(52) U.S. Cl. .................. 396/64; 396/170; 396/237; 348/230.1; 348/364

(58) Field of Classification Search ................ 396/457, 396/63–65, 89, 155, 168, 170, 237; 348/221.1, 348/230.1, 362, 363, 364
See application file for complete search history.

(56) References Cited

U.S. PATENT DOCUMENTS
2003/0086005 A1* 5/2003 Nakamura ............... 348/223.1
2003/0179302 A1   9/2003 Harada et al.

FOREIGN PATENT DOCUMENTS
JP   2003-264736 A   9/2003

\* cited by examiner

Primary Examiner—Rochelle-Ann J Blackman
(74) Attorney, Agent, or Firm—Canon U.S.A., Inc., IP Division (57) ABSTRACT

An image capturing apparatus includes an image sensor which photo-electrically converts an object image formed by an objective lens, a shutter which is arranged between the objective lens and the image sensor, opens to set the image sensor in an exposure enable state, and closes to set the image sensor in a light-shielding state, a dark image acquisition unit which acquires a dark image by closing the shutter and causing the image sensor to accumulate charges, and a control unit which controls an aperture size of an aperture stop arranged at the objective lens, wherein if the aperture stop has a aperture size more than a predetermined aperture size before acquiring the dark image, the dark image acquisition unit acquires the dark image after the control unit controls the aperture stop to an aperture size not more than the predetermined aperture size.

9 Claims, 7 Drawing Sheets

IMAGE CAPTURING APPARATUS, CONTROL METHOD THEREOF, PROGRAM, AND STORAGE MEDIUM

BACKGROUND OF THE INVENTION

1. Field of the Invention

The present invention relates to a technique of causing a single-lens reflex type digital camera to accurately capture a dark image.

2. Description of the Related Art

In a proximity shooting mode such as close-up shooting or copying using a single-lens reflex type camera, images may be blurred by impact generated as a quick return mirror moves up. To prevent this, some cameras have a mirror-up shooting function which moves the mirror up before shooting and runs the shutter curtain after impact vibrations of the mirror have decayed.

Some digital cameras have a function of accumulating charges as in final shooting without exposure of a solid-state image sensor and capturing dark image data as a noise component such as a dark current. Dark noise correction can be done by executing an arithmetic process using the dark image data and the final captured image data that is read out after charge accumulation with exposure of the image sensor.

It is therefore possible to correct image data which degrades due to dark current noise generated in the image sensor or pixel defects generated by small flaws unique to the image sensor, and obtain a high-quality image.

Especially, since dark current noise increases along with the charge accumulation time and increasing temperature of the image sensor, a large image quality improving effect can be obtained for long time exposures or exposures at a high temperature. For digital camera users, dark noise correction is a beneficial function.

In the technique disclosed in Japanese Patent Laid-Open No. 2003-264736, a dark image is captured under conditions where the dark current is expected to be large because of the shooting conditions or ambient conditions. Under other conditions, fixed pattern noise is corrected by using correction data stored in advance without capturing a dark image. This prevents degradation in image quality while minimizing dark image capturing that generates a shutter release time lag.

In the single-lens reflex type digital camera having a mirror-up shooting function, conventionally, final captured image data is acquired by final shooting with exposure while keeping the quick return mirror up. After that, dark image data is acquired by charge accumulation similar to that in final shooting without exposure. Then, dark noise correction is executed by using the final captured image data and dark image data. Conventionally, in shooting for acquiring dark image data without exposure (to be referred to as dark image capturing), the quick return mirror is kept down. For this reason, the shutter curtain and quick return mirror shield light to the image sensor so no light enters the image sensor in dark image capturing.

However, since the quick return mirror is moved up and down in every shooting even during mirror-up shooting, time is required, or the sound of mirror actuation is generated in a continuous shooting mode.

A technique that allows continuous shooting while keeping the quick return mirror up has been proposed. This technique shortens the shooting time and enables quiet shooting without any sound of mirror actuation. However, in, e.g., long-time exposure, the same time as in final shooting is necessary for capturing a dark image. If dark image capturing is executed for a long time (e.g., 1 sec or more) while keeping the quick return mirror up, light can enter from a very small gap around the closed shutter to the image sensor. This can disable accurate dark noise correction.

SUMMARY OF THE INVENTION

It is desirable to solve one or more of the above described problems. For example, it is desirable to capture an accurate dark image even when the quick return mirror is moved up during dark image capturing.

According to a first aspect of the present invention, there is provided an image capturing apparatus comprising an image sensor, a shutter, arranged between an objective lens and the image sensor, and openable to set the image sensor into an exposure enable state in which the image sensor can perform photoelectric conversion of an object image formed thereon, and closeable to set the image sensor into a light-shielding state, a dark image acquisition unit operable to cause the image sensor to accumulate charges when in the light shielding-state to acquire a dark image, and a controller operable, if an aperture size of an aperture stop is greater than a predetermined aperture size before the dark image is acquired, to control the aperture size of the aperture stop to be not greater than the predetermined aperture size during dark image acquisition.

According to the second aspect of the present invention, there is provided an image capturing method comprising the steps of, setting an image sensor, usable to carry out photoelectrical conversion of an object image formed thereon, into a light-shielding state by closing a shutter arranged between an objective lens and the image sensor, acquiring a dark image by causing the image sensor to accumulate charges when set in the light-shielding state, and if an aperture size of an aperture stop arranged at the objective lens is greater than a predetermined aperture size, controlling the aperture size of the aperture stop to be not greater than the predetermined aperture size during dark image acquisition.

Further features of the present invention will become apparent from the following description of exemplary embodiments with reference to the attached drawings.

DESCRIPTION OF THE EMBODIMENTS

Embodiments of the present invention will now be described in detail with reference to the accompanying drawings.

Figure 1:
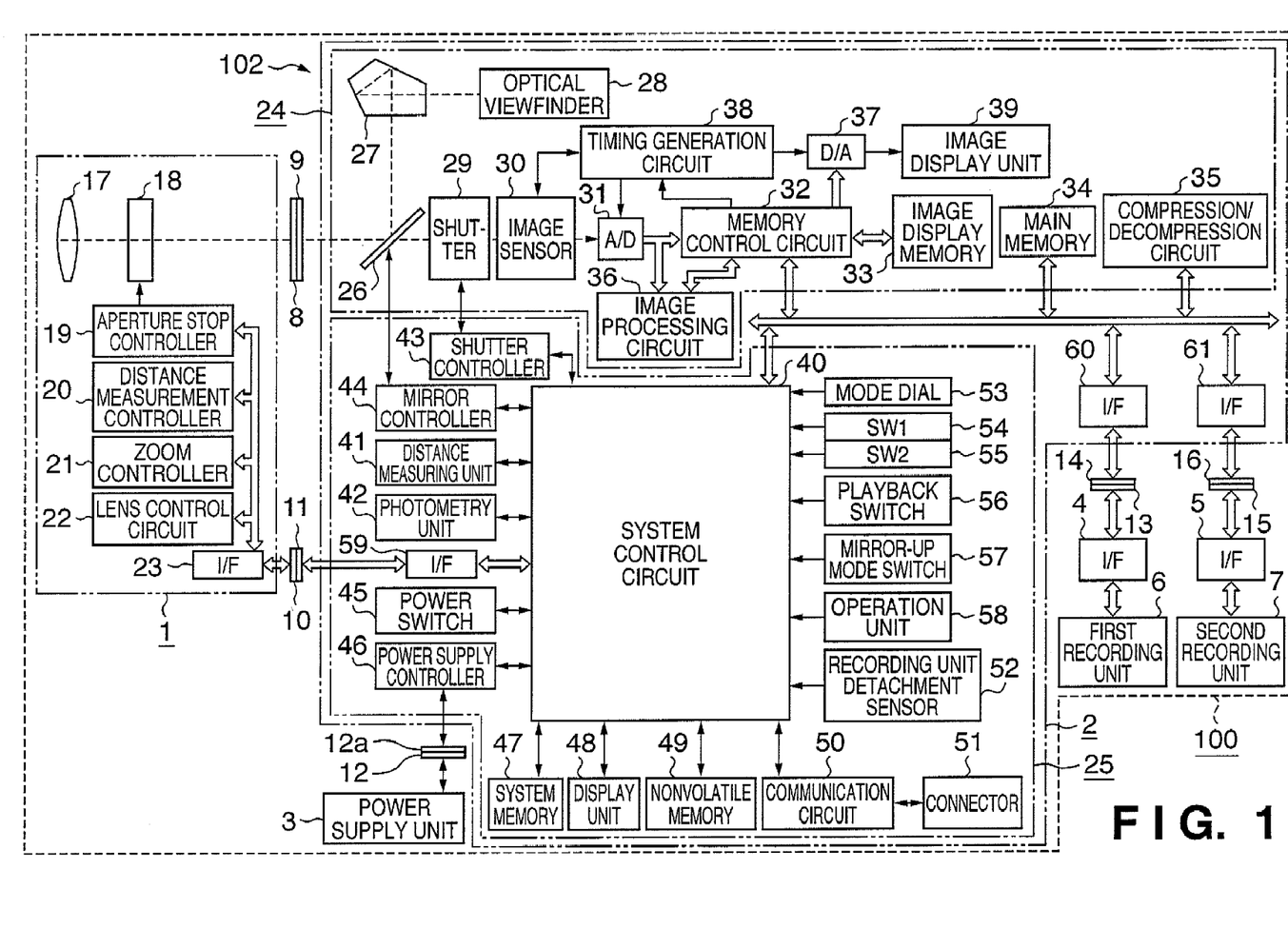
FIG. 1 is a block diagram showing the arrangement of a digital camera according to an embodiment of the present invention.

FIG. 1 is a block diagram showing the arrangement of a digital camera serving as an image capturing apparatus according to an embodiment of the present invention.

Referring to FIG. 1, a digital camera 100 includes a main body 102 of the digital camera, and an interchangeable type lens unit 1 detachable from the main body 102. The main body 102 includes an image processing unit 2 which captures object light from the lens unit 1, and a power supply unit 3 which supplies power to the image processing unit 2. The power supply unit 3 includes a primary cell such as an alkaline cell or lithium cell, or a secondary cell such as an NiCd cell, NiMH cell, or Li ion cell. The main body 102 has first and second recording units 6 and 7 including a memory card or hard disk connected to the image processing unit 2 via interface (I/F) units 4 and 5.

The lens unit 1 and main body 102 are connected to each other mechanically via lens mounts 8 and 9 and electrically via connectors 10 and 11. The lens mount 9 or connector 11 on the side of the main body 102 incorporates a lens detachment sensor (not shown) which detects the presence/absence of attachment of the lens unit 1.

The power supply unit 3 and main body 102 are electrically connected to each other via connectors 12 and 12a. The I/F units 4 and 5 connected to the first and second recording units 6 and 7 are electrically connected to the main body 102 via connectors 13, 14, 15, and 16. In this embodiment, the power supply unit 3 includes a battery. However, it may include any other power supply means such as an AC adapter.

More specifically, the lens unit 1 includes an objective lens 17 which receives light (object image) from an object, and an aperture stop 18 which changes the aperture size to adjust the light amount of the object image. The lens unit 1 also includes an aperture stop controller 19 which controls the aperture size of the aperture stop 18 in cooperation with a shutter controller (to be described later) on the basis of photometry information from a photometry unit 42 (to be described later) in the main body 102. The lens unit 1 also includes a distance measurement controller 20 which controls focusing of the objective lens 17, and a zoom controller 21 which controls zooming of the objective lens 17. The lens unit 1 also includes a lens system control circuit 22 which controls the entire lens unit 1, and an I/F unit 23 which controls the interface operation between the lens unit 1 and the main body 102 via connectors 10, 11.

The lens system control circuit 22 includes a memory which stores constants, variables, and programs for operations, and a nonvolatile memory which holds identification information unique to the lens unit 1, management information, functional information such as the open and largest f-numbers and a focal length, and current and past set values.

The connector 10 can transmit control signals, state signals, and data signals between the main body 102 and the lens unit 1 and also bi-directionally supply various kinds of currents. Note that the connector 10 may be designed to enable not only telecommunication but also optical communication or speech communication.

The image processing unit 2 in the main body 102 includes an image processing block 24 which processes an optical signal from the lens unit 1 as image data, and a system control block 25 which controls the system of the entire digital camera.

More specifically, the image processing block 24 includes a quick return mirror 26, pentaprism 27, and optical viewfinder 28 which forms an image of light that has traveled via the quick return mirror 26 and pentaprism 27 and displays the image of an object. The image processing block 24 also includes a shutter 29 which controls the exposure time, an image sensor 30 which accumulates charges from the optical image and converts the optical image into an electrical signal, and an A/D converter 31 which converts an analog electrical signal output from the image sensor 30 into a digital electrical signal. The image processing block 24 also includes a memory control circuit 32 which controls the entire image processing block 24, an image display memory 33 in which image display data is written via the memory control circuit 32, and a main memory 34 which stores captured still images and moving images. The image processing block 24 also includes a compression/decompression circuit 35 which compresses or decompresses image data stored in the main memory 34 by using adaptive discrete cosine transformation (ADCT) or the like. The image processing block 24 also includes an image processing circuit 36 which executes predetermined pixel interpolation, color conversion, and other arithmetic processes for image data for the A/D converter 31 or memory control circuit 32. The image processing block 24 also includes a D/A converter 37 which converts an output signal (digital electrical signal) from the memory control circuit 32 into an analog electrical signal. The image processing block 24 also includes a timing generation circuit 38 which supplies a clock signal or control signal to the image sensor 30, A/D converter 31, and D/A converter 37 under the control of the memory control circuit 32. The image processing block 24 also includes an image display unit 39 formed from, e.g., a TFT-LCD that displays image display data written in the image display memory 33. When captured image data is successively displayed on the image display unit 39, an electronic viewfinder function can be implemented. The image display unit 39 can arbitrarily turn on/off display in accordance with an instruction from a system control circuit 40 (to be described later). When the display is turned off, the power consumption of the image processing unit 2 can be reduced.

The main memory 34 has a storage capacity sufficient to store a predetermined number of still images or a moving image having a predetermined time length. This enables a large quantity of image data to be quickly written even in continuous shooting or panoramic shooting for continuously shooting a plurality of still images. Note that the main memory 34 is also usable as the work area of the system control circuit 40 (to be described later).

The above-described optical viewfinder 28 has predetermined display functions and displays various kinds of information such as in-focus, ready for shooting, camera shake warning, shutter speed/f-number, exposure compensation, and recording medium write operation.

In the system control block 25, a number of constituent elements are connected to the system control circuit 40 that controls the entire system of the image processing unit 2.

A distance measuring unit 41 measures the in-focus state of an optical image received from the lens unit 1 via the quick return mirror 26 and a sub-mirror (not shown) for distance measurement, i.e., executes an AF (Auto Focus) process.

The photometry unit 42 measures the exposure state of an optical image received from the lens unit 1 via the quick return mirror 26 and a lens (not shown) for photometry, i.e., executes an AE (Auto Exposure) process.

A shutter controller 43 controls the shutter 29 in cooperation with the aperture stop controller 19 that controls the aperture stop 18 on the basis of photometry information from the photometry unit 42.

A mirror controller 44 controls driving of the quick return mirror 26 in accordance with a signal from the system control circuit 40.

The system control circuit 40 also executes the AF process, AE process, and EF process by TTL (Through The Lens) scheme for the distance measuring unit 41, photometry unit 42, and shutter controller 43 on the basis of an arithmetic result obtained from the image processing circuit 36. The system control circuit 40 also executes an AWB (Auto White Balance) process.

A power switch 45 can selectively set the power ON mode or power OFF mode of the main body 102. The power switch 45 can also selectively set the power ON mode or power OFF mode of each of various accessories including the lens unit 1, external electronic flash, and first and second recording units 6 and 7 connected to the main body 102.

A power supply controller 46 including a cell detection circuit, DC/DC converter, and change-over switch which switches the part to be energized detects the presence/absence of attachment of a cell serving as the power supply unit 3, the type of cell, and the battery level. The power supply controller 46 controls the DC/DC converter on the basis of the detection result or an instruction from the system control circuit 40 and supplies a necessary voltage to the units including the first and second recording units 6 and 7 for a necessary period.

A system memory 47 stores constants, variables, and programs for operations of the system control circuit 40.

A display unit 48 can include a liquid crystal display (LCD), light-emitting diodes (LEDs), lamps, and speaker and presents an operation state or message using a text, image, or sound in accordance with program execution in the system control circuit 40. The display unit 48 is arranged at a single or a plurality of visible positions near an operation unit (to be described later).

The LCD of the display unit 48 displays, e.g., single shot/continuous shooting, self timer, compression ratio, number of recording pixels, number of recorded images, number of recordable images, shutter speed, f-number, exposure compensation, red eye mitigation, macro shooting, and buzzer setting. The clock battery level, battery level, error message, information by a plurality of digits, the attached states of the first and second recording units 6 and 7, the attached state of the lens unit 1, the operation of a communication circuit (to be described later), date/time, and the connection state of an external computer can also be displayed.

The LEDs of the display unit 48 indicate, e.g., in-focus, ready for shooting, camera shake warning, recording medium write operation, macro shooting settings, and secondary cell charge state.

The lamps of the display unit 48 include, e.g., a self timer notification lamp. The self timer notification lamp can also be used as AF auxiliary light.

A nonvolatile memory 49 is an electrically erasable and programmable memory including, e.g., an EEPROM.

A communication circuit 50 has various kinds of communication functions such as RS232C, IEEE1394, P1284, SCSI, modem, LAN, and wireless communication.

A connector 51 connects the main body 102 to another external device via the communication circuit 50. When the communication circuit 50 has a wireless communication function, an antenna is connected to the communication circuit 50 in place of the connector 51.

A recording unit detachment sensor 52 detects whether the connectors 13 and 15 are attached to the connectors 14 and 16.

Operation members such as a mode dial 53, first and second shutter switches 54 and 55, playback switch 56, mirror-up mode switch 57, and operation unit 58 are connected to the system control circuit 40 and instruct it to execute various operations.

The mode dial 53 can select a shooting mode. Shooting modes include an automatic shooting mode, programmed shooting mode, shutter speed priority shooting mode, aperture stop priority shooting mode, manual shooting mode, focal depth priority (depth) shooting mode, and panoramic shooting mode. The shooting modes also include a portrait shooting mode, landscape shooting mode, close-up shooting mode, sports shooting mode, and nightscape shooting mode. The mode dial 53 can selectively set one of these modes.

The mirror-up mode switch 57 switches between a mirror-up shooting mode and a normal shooting mode. In the mirror-up shooting mode, two modes can be selected: a mode in which the quick return mirror 26 moves down in every shooting and a mode in which once the quick return mirror 26 moves up, shooting can be performed continuously while keeping the quick return mirror up until a mirror-down instruction is received.

When the user presses a shutter button (not shown) halfway, the first shutter switch (SW1) 54 is turned on to instruct the start of an operation such as the AF process, AE process, AWB process, or EF process.

When the user presses the shutter button (not shown) fully, the second shutter switch (SW2) 55 is turned on to instruct the start of a series of shooting operations. The shooting operations include the mirror-up operation, shutter actuation, and mirror-down operation. The shooting operations also include a write process of writing image data from the image sensor 30 in the main memory 34, and a development process of executing development based on arithmetic processes by the image processing circuit 36 or memory control circuit 32. The shooting operations also include a read process of reading out image data from the main memory 34, an image data compression process by the compression/decompression circuit 35, and a recording process of writing image data in the first or second recording unit 6 or 7.

The playback switch 56 instructs the start of a playback operation of reading out captured images from the main memory 34 or first or second recording unit 6 or 7 and displaying them on the image display unit 39 in a shooting mode.

The operation unit 58 includes various buttons and touch panel and has a menu button, setting button, macro button, multi-window playback/page break button, flash setting button, and single shot/continuous shooting/self timer switch button. The operation unit 58 also has a menu move plus (+) button, menu move minus (−) button, playback image move plus (+) button, playback image move minus (−) button, image quality select button, exposure compensation button, and date/time setting button. The operation unit 58 also has a select/switch button which selectively sets various functions in shooting in, e.g., the panoramic mode or in executing playback, and a determination/execution button which sets determination and execution of various functions in shooting in, e.g., the panoramic mode or in executing playback. The operation unit 58 also has an image display switch which turns on/off the image display unit 39, and a quick review switch which sets a quick review function of automatically playing back captured image data immediately after shooting. The operation unit 58 also has a compression mode switch which selects an image sensor RAW mode in which the compression ratio of JPEG compression is selected, or a signal from the image sensor 30 is directly digitized and recorded on a recording medium. The operation unit 58 also has a mode setting switch which sets various function modes such as a playback mode, multi-window playback/erase mode, and PC connection mode. The operation unit 58 also has an AF mode-setting switch which selectively sets a one-shot AF mode or a servo AF mode as an AF mode when the user presses the first shutter switch (SW1) 54. In the one-shot AF mode, the AF operation starts, and once an in-focus state is obtained, that state is continuously held. In the servo AF mode, the AF operation is continuously performed while the user is pressing the first shutter switch (SW1) 54. The operation unit 58 also has a mirror-down switch which moves the mirror down during the mirror-up mode.

As for the functions of the plus and minus buttons, the numerical values or functions can more easily be selected by providing a rotary dial switch.

An I/F unit 59 controls the interface operation to the lens unit 1.

The main body 102 incorporates I/F units 60 and 61. The I/F units 60 and 61 are connected, via the connectors 13 to 16, to the I/F units 4 and 5 connected to the first and second recording units 6 and 7 and control the interface operation to the recording unit side.

The operation of the digital camera of this embodiment will be described next.

Figure 2:
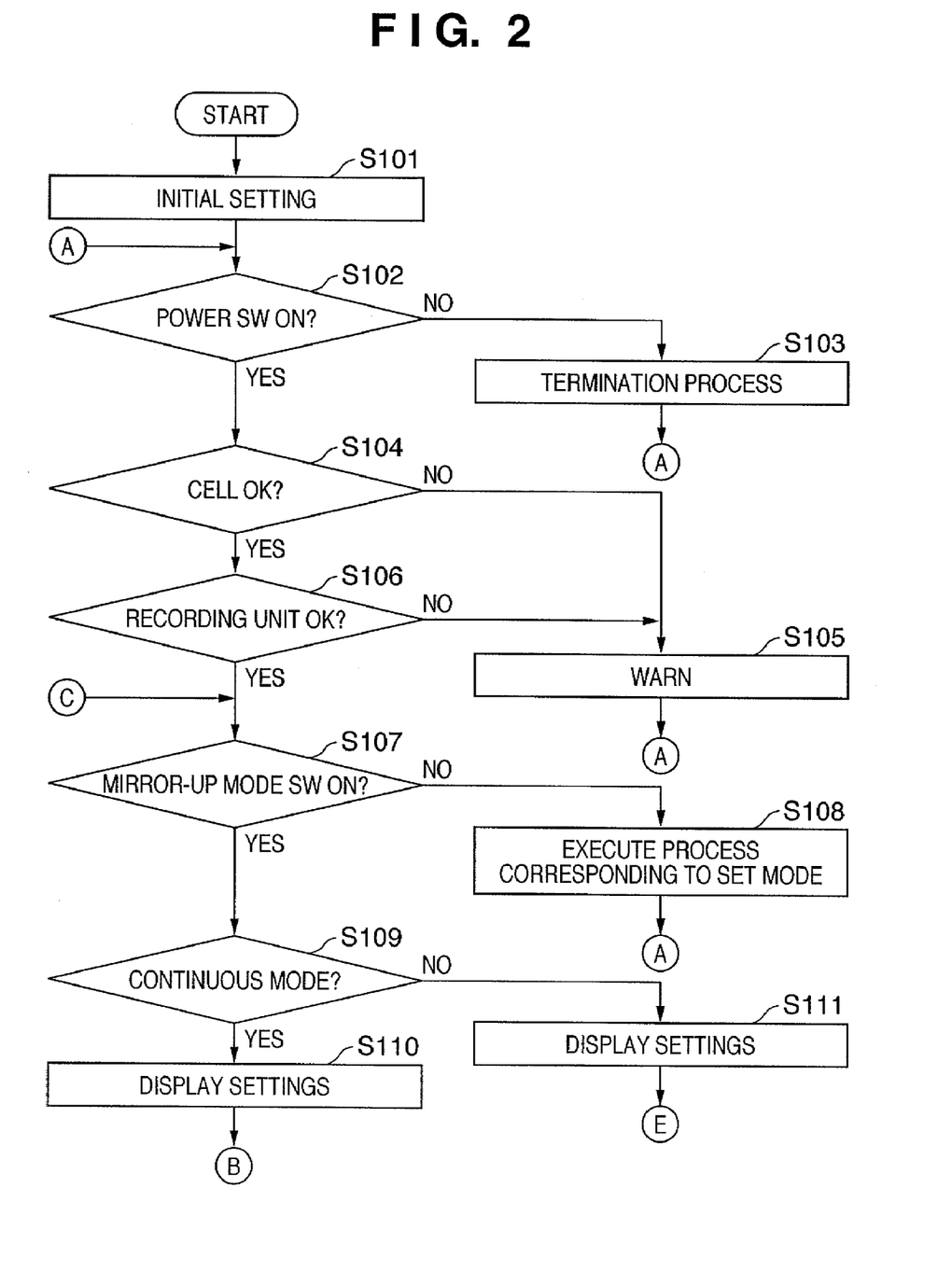
FIG. 2 is a flowchart illustrating the operation of the digital camera according to the embodiment.
Figure 3:
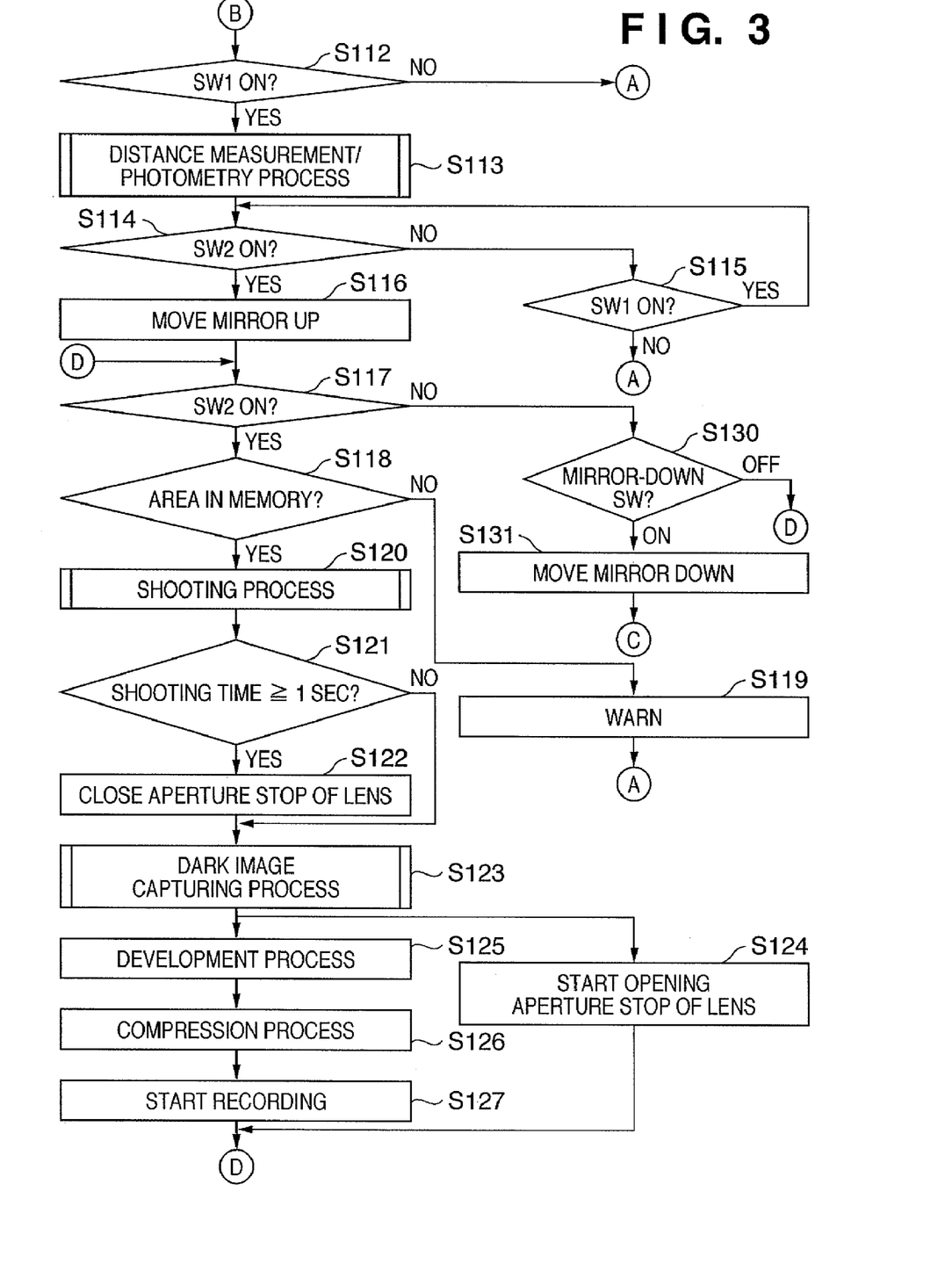
FIG. 3 is a flowchart illustrating the operation of the digital camera according to the embodiment.
Figure 4:
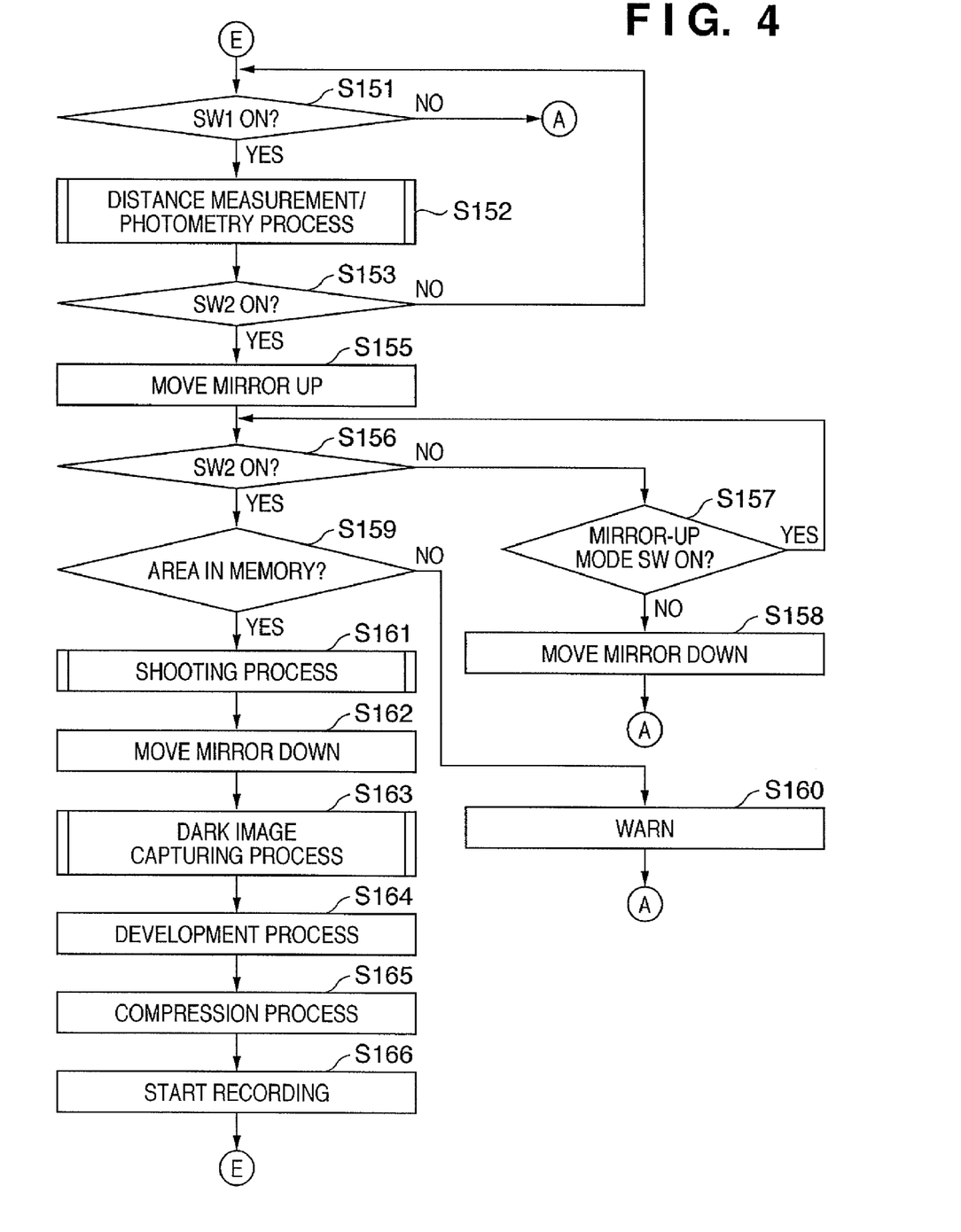
FIG. 4 is a flowchart illustrating the operation of the digital camera according to the embodiment.

FIGS. 2, 3, and 4 are flowcharts illustrating the operations of the digital camera according to this embodiment. These operations are executed by causing the system control circuit 40 to execute programs stored in the system memory 47.

Referring to FIG. 2, in step S101, when the digital camera is powered on upon, e.g., exchanging the cell, the system control circuit 40 initializes flags and control variables and executes necessary initial settings for the units of the digital camera 100.

In step S102, it is determined whether the power switch 45 is ON. If the power switch 45 is not ON, a predetermined termination process is executed in step S103, and the process returns to step S102. More specifically, display of each display unit is changed to an end state, and parameters, set values, and set modes including the flags and control variables are written in the nonvolatile memory 49. Additionally, a termination process is executed by, e.g., causing the power supply controller 46 to shut off unnecessary power to the constituent elements of the main body 102, including the image display unit 39, and the process returns to step S102.

If it is determined in step S102 that the power switch 45 is ON, the process advances to step S104 to cause the power supply controller 46 to determine whether the level of the cell included in the power supply unit 3 is sufficiently high. If the level of the cell is not sufficient, the display unit 48 executes predetermined warning by an image or sound (step S105), and the process returns to step S102.

If the level of the cell is sufficient in step S104, the process advances to step S106 to determine whether the first and/or second recording unit 6 or 7 is attached to the main body 102. If the first and/or second recording unit 6 or 7 is attached to the main body 102, the management information of image data recorded in the first and/or second recording unit 6 or 7 is acquired. It is determined whether the operation state indicates a problem in the operation of the main body 102 and, more particularly, in the image data recording/playback operation of the first and/or second recording unit 6 or 7. If a problem is present, the process advances to step S105 to cause the display unit 48 to execute predetermined warning by an image or sound, and the process returns to step S102.

If the operation of the recording unit 6 or 7 has no problem in step S106, the process advances to step S107 to determine whether the mirror-up mode switch 57 is ON. If the mirror-up mode switch 57 is not ON, the process advances to step S108 to execute a predetermined process corresponding to the set control mode. After execution, the process returns to step S102.

If it is determined in step S107 that the mirror-up mode switch 57 is ON, the process advances to step S109. The mode is determined, i.e., the mode in which the mirror moves down in every shooting during mirror-up shooting or the continuous mode in which once the mirror moves up, shooting is performed while keeping the mirror up until reception of a mirror-down instruction. In the mode to move the mirror down in every shooting, the process advances to step S111. In the continuous mode, the process advances to step S110.

In step S110 or S111, the display unit 48 displays various setting states of the main body 102 by images or sound. The process advances from step S110 to step S112 in FIG. 3 or from step S111 to step S151 in FIG. 4.

Note that if the image display unit 39 is set to be able to display images, it also displays various setting states of the main body 102 by images or sound.

In step S112 in FIG. 3, it is determined whether the first shutter switch (SW1) 54 is ON. If the first shutter switch (SW1) 54 is not ON, the process returns to step S102 in FIG. 2. If the first shutter switch (SW1) 54 is ON, the distance measurement/photometry process is executed in step S113, and the process advances to step S114. More specifically, the distance measurement process is executed to make the objective lens 17 focus on the object. The photometry process is executed to decide the f-number and shutter time.

In step S114, it is determined whether the second shutter switch (SW2) 55 is ON. If the second shutter switch (SW2) 55 is not ON, the process advances to step S115 to determine whether the first shutter switch (SW1) 54 is ON. If the first shutter switch (SW1) 54 is turned on, the process returns to step S114. If the first shutter switch (SW1) 54 is turned off, it is determined that shooting has finished, and the process returns to step S102 in FIG. 2.

If it is determined in step S114 that the second shutter switch (SW2) 55 is ON, the process advances to step S116.

In step S116, the mirror controller 44 moves the quick return mirror 26 up in accordance with a signal from the system control circuit 40.

In step S117, it is determined again whether the second shutter switch (SW2) 55 is ON. If the second shutter switch (SW2) 55 is not ON, the process advances to step S130 to determine whether a mirror-down switch (not shown) is ON. If the mirror-down switch is OFF, the process returns to step S117. If the mirror-down switch is ON, the mirror controller 44 moves the quick return mirror 26 down in accordance with a signal from the system control circuit 40. Then, the process returns to step S107 in FIG. 2.

If it is determined in step S117 that the second shutter switch (SW2) 55 is ON, the process advances to step S118.

In step S118, it is determined whether the main memory 34 has a storage area capable of storing data. If no storage area exists, the display unit 48 executes predetermined warning by an image or sound in step S119. Then, the process returns to step S102 in FIG. 2. For example, if the number of images obtained by continuous shooting and stored in the image storage buffer area of the main memory 34 just reaches the maximum, and the images are not yet recorded or written from the main memory 34 to the first or second recording unit 6 or 7, the process advances to step S119.

When captured image data are compressed and stored in the main memory 34, whether the image storage buffer area of the main memory 34 has an area capable of storing data is determined considering that the image data amount after compression changes depending on the settings of the compression mode.

If the main memory 34 has a storage area in step S118, a shooting process is executed in step S120, and the process advances to step S121. More specifically, an image-capturing signal corresponding to charges accumulated for a predetermined time upon image capturing is read out from the image sensor 30. The captured image data is sent from the A/D converter 31 to the memory control circuit 32 via the image processing circuit 36 or from the A/D converter 31 directly to the memory control circuit 32 and written in a predetermined area of the main memory 34, and the process advances to step S121.

If the shooting time is greater than or equal to 1 sec in step S121, the process advances to step S122 to cause the aperture stop controller 19 to close the aperture stop 18 of the lens unit 1 up to f11. After the aperture stop is closed, the process advances to step S123 to capture a dark image. Then, the process advances to steps S124 and S125.

If the shooting time is shorter than 1 sec in step S121, the process advances to step S123 to capture a dark image without closing the aperture stop 18.

Dark image capturing indicates a process of accumulating charges of the image sensor 30 for a time equal to that in shooting while keeping the shutter 29 closed. When a dark image is captured, information corresponding to only a noise component such as a dark current generated in the image sensor can be obtained. Noise in the captured image can be reduced by, e.g., subtracting the dark image from the captured image. When the shooting time is long and, e.g., 1 sec or more, dark image capturing takes the same time, and a very small amount of light which is diffracted from, e.g., the gap around the shutter 29 may leak and enter the image sensor. In this case, it may be impossible to capture an accurate dark image. To prevent this, in this embodiment, when the shooting time is long, the aperture stop 18 is closed to minimize the amount of light entering the camera in dark image capturing, thereby acquiring an accurate dark image.

More specifically, in the dark image capturing process, the aperture stop 18 is closed up to f11. Since the aperture size is small, the incident light amount from the lens unit 1 is small. For this reason, even in the mirror-up state, it is possible to obtain a sufficient light shielding effect and capture an accurate dark image. Note that if the aperture size of the aperture stop 18 has been already closed up to f11 before capturing the dark image, the incident light amount into the image sensor 30 is sufficiently small. Therefore, the aperture stop controller 19 may drive the aperture stop 18 in step S122 only when the aperture size of the aperture stop 18 is larger than f11 before capturing the dark image.

In this embodiment, when the shooting process time is 1 sec or more, the aperture stop is closed to f11 in dark image capturing. However, the time is not limited to 1 sec and can arbitrarily be set in accordance with the degree of light leakage into the dark image.

When the shooting time is shorter than 1 sec, the process of closing the aperture stop of the lens is omitted. In this case, the dark image capturing process in step S123 can be omitted together.

The aperture stop 18 is closed up to f11. However, the f-number is not limited to this and can be larger or smaller than f11.

After the end of the dark image capturing process, the aperture stop controller 19 starts controlling to open the aperture stop 18 of the lens unit 1 in step S124. The operation in step S124 may be done immediately before the start of the next shooting process in consideration of continuous shooting.

In step S125, the captured image data written in the predetermined area of the main memory 34 is read out. Various kinds of development processes including the AWB process, gamma conversion process, and color conversion process are executed using the arithmetic result stored in the system memory 47 or the internal memory of the system control circuit 40. In the development processes, a subtraction process is performed using the dark image data captured by the dark image capturing process in step S123, and a dark correction process is executed to cancel, e.g., dark current noise in the image sensor 30.

In step S126, the image data written in the main memory 34 is read out. The compression/decompression circuit 35 compresses the image in accordance with the set mode. The image data that has undergone the series of processes is written in a predetermined area of the main memory 34.

In step S127, a recording operation starts. More specifically, the image data is read out from the main memory 34. A process of writing the recording image data in the first or second recording unit 6 or 7 via the I/F unit 60 or 61 and connector 14 or 16 starts. Every time image data that has undergone the above-described series of processes after shooting is newly written in a predetermined area of the main memory 34, the recording start process is executed for the recording image data. While the image data write in the first or second recording unit 6 or 7 is progressing, the display unit 48 indicates the write operation in the first or second recording unit 6 or 7 by, e.g., flashing, e.g., an LED, thereby explicitly showing the progress of the write operation.

When the aperture stop 18 of the lens unit 1 is opened, and the recording operation is ended in step S127, the process returns to step S117 to repeat the above-described process.

FIG. 4 is a flowchart illustrating an operation that is performed when the mode to move the mirror down in every shooting during mirror-up shooting is selected in step S109 in FIG. 2. This flowchart follows step S111.

In step S151 in FIG. 4, it is determined whether the first shutter switch (SW1) 54 is ON. If the first shutter switch (SW1) 54 is not ON, the process returns to step S102 in FIG. 2. If the first shutter switch (SW1) 54 is ON, the distance measurement/photometry process is executed in step S152, and the process advances to step S153. More specifically, the distance measurement process is executed to make the objective lens 17 focus on the object. The photometry process is executed to decide the f-number and shutter time.

In step S153, it is determined whether the second shutter switch (SW2) 55 is ON. If the second shutter switch (SW2) 55 is not ON, the process returns to step S151.

If it is determined in step S153 that the second shutter switch (SW2) 55 is ON, the process advances to step S155.

In step S155, the mirror controller 44 moves the quick return mirror 26 up in accordance with a signal from the system control circuit 40.

In step S156, it is determined again whether the second shutter switch (SW2) 55 is ON. If the second shutter switch (SW2) 55 is not ON, the process advances to step S157 to determine whether the mirror-up mode switch 57 is ON. If the mirror-up mode switch 57 is not ON, the process advances to step S158. The mirror controller 44 moves the quick return mirror 26 down in accordance with a signal from the system control circuit 40. Then, the process returns to step S102 in FIG. 2.

If the mirror-up mode switch 57 is ON in step S157, the process returns to step S156.

If it is determined in step S156 that the second shutter switch (SW2) 55 is ON, the process advances to step S159.

In step S159, it is determined whether the main memory 34 has a storage area capable of storing data. If no storage area exists, the display unit 48 executes predetermined warning by an image or sound in step S160. Then, the process returns to step S102 in FIG. 2. For example, if the number of images obtained by continuous shooting and stored in the image storage buffer area of the main memory 34 just reaches the maximum, and the images are not yet recorded or written from the main memory 34 to the first or second recording unit 6 or 7, the process advances to step S160.

When captured image data are compressed and stored in the main memory 34, whether the image storage buffer area of the main memory 34 has an area capable of storing data is determined considering that the image data amount after compression changes depending on the settings of the compression mode.

If the main memory 34 has a storage area in step S159, a shooting process is executed in step S161, and the process advances to step S162. More specifically, an image-capturing signal corresponding to charges accumulated for a predetermined time upon image capturing is read out from the image sensor 30. The captured image data is sent from the A/D converter 31 to the memory control circuit 32 via the image processing circuit 36 or from the A/D converter 31 directly to the memory control circuit 32 and written in a predetermined area of the main memory 34, and the process advances to step S162.

In step S162, after the end of the shooting process, the mirror controller 44 moves the quick return mirror 26 down in accordance with a signal from the system control circuit 40. Then, the process advances to step S163 to capture a dark image.

In step S164, the captured image data written in the predetermined area of the main memory 34 is read out. Various kinds of development processes including the AWB process, gamma conversion process, and color conversion process are executed using the arithmetic result stored in the system memory 47 or the internal memory of the system control circuit 40. In the development processes, a subtraction process is performed using the dark image data captured by the dark image capturing process in step S163, and a dark correction process is executed to cancel, e.g., dark current noise in the image sensor 30.

In step S165, the image data written in the main memory 34 is read out. The compression/decompression circuit 35 compresses the image in accordance with the set mode. The image data that has undergone the series of processes is written in a predetermined area of the main memory 34.

In step S166, a recording operation starts. More specifically, the image data is read out from the main memory 34. A process of writing the recording image data in the first or second recording unit 6 or 7 via the I/F unit 60 or 61 and connector 14 or 16 starts. Every time image data that has undergone the above-described series of processes after shooting is newly written in a predetermined area of the main memory 34, the recording start process is executed for the recording image data. While the image data write in the first or second recording unit 6 or 7 is progressing, the display unit 48 indicates the write operation in the first or second recording unit 6 or 7 by, e.g., flashing, e.g., an LED, thereby explicitly showing the progress of the write operation.

After that, the process returns to step S151 to repeat the above-described process.

Figure 5:
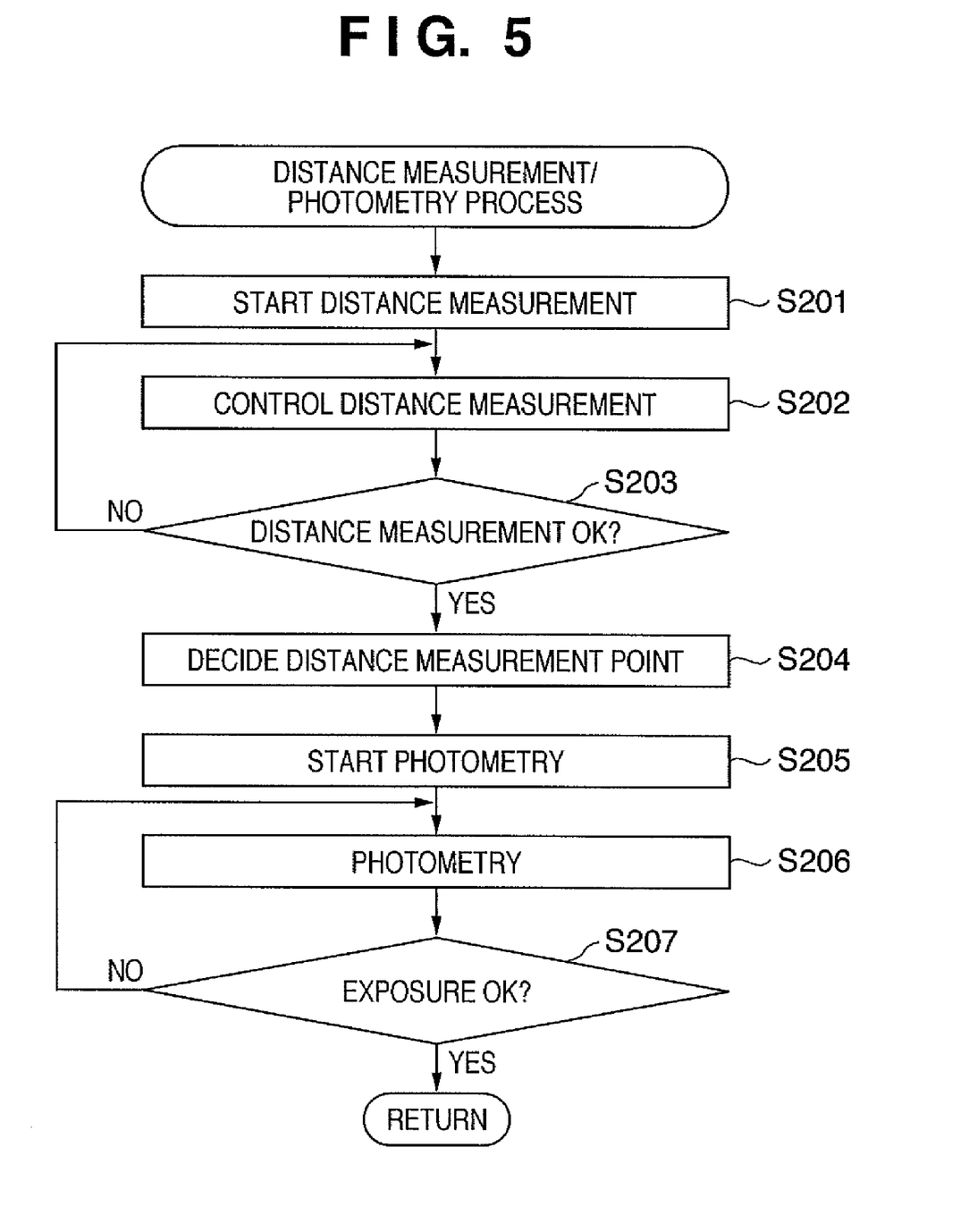
FIG. 5 is a flowchart illustrating the distance measurement/photometry process routine of the digital camera according to the embodiment.

FIG. 5 is a flowchart illustrating the distance measurement/photometry process routine executed in step S113 in FIG. 3. The same process is executed even in step S152 in FIG. 4.

In the distance measurement/photometry process, the system control circuit 40 and the aperture stop controller 19 or distance measurement controller 20 exchange various kinds of signals via the I/F unit 59, connector 11, connector 10, I/F unit 23, and lens system control circuit 22.

In step S201, the AF process starts using the distance measuring unit 41 and distance measurement controller 20. In step S202, the in-focus state of the image formed as an optical image is determined. The distance measurement controller 20 drives the objective lens 17, and the distance measuring unit 41 detects the in-focus state. In step S203, it is determined whether the distance measurement is adequate. If NO in step S203, the process returns to step S202 to continue distance measurement control. If YES in step S203, the process advances to step S204 to decide a distance measurement point in the in-focus state from a plurality of distance measurement points in the image capturing screen. Distance measurement data is stored in the system memory 47 or the internal memory of the system control circuit 40 together with the decided distance measurement point data, and the process advances to step S205.

In step S205, the AF process starts using the photometry unit 42. More specifically, the optical image that has entered the objective lens 17 is supplied to the photometry unit 42, and the exposure state of the image formed as an optical image is measured. In step S207, it is determined whether the exposure state is adequate. If NO in step S207, the process returns to step S206 to continue photometry control. If YES in step S207, the photometric data is stored in the system memory 47 or the internal memory of the system control circuit 40. Then, the process returns to the main routine (FIG. 3 or 4). The f-number and shutter speed are decided in accordance with the exposure result detected by the photometry process and a control mode set by the mode dial 53. The charge accumulation time of the image sensor 30 is decided in accordance with the shutter speed. The shooting process or dark image capturing process is performed on the basis of the charge accumulation time.

Figure 6:
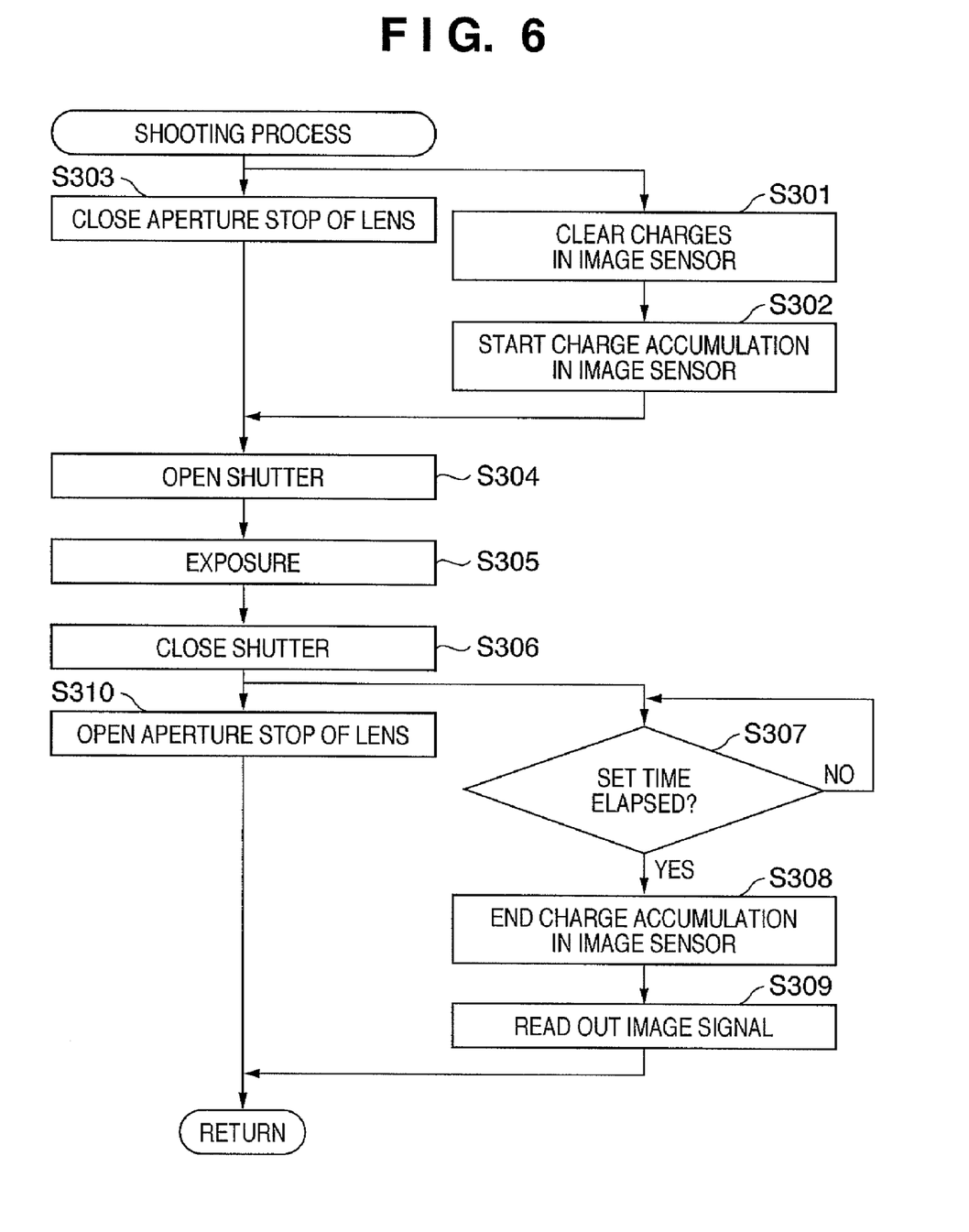
FIG. 6 is a flowchart illustrating the shooting process routine of the digital camera according to the embodiment.

FIG. 6 is a flowchart illustrating the shooting process routine executed in FIG. 3 or 4.

In the shooting process, the system control circuit 40 and the aperture stop controller 19 or distance measurement controller 20 exchange various kinds of signals via the I/F unit 59, connector 11, connector 10, I/F unit 23, and lens system control circuit 22.

In step S301, charges accumulated in the image sensor 30 are cleared. In step S302, charge accumulation in the image sensor 30 starts. In step S304, the shutter controller 43 drives and opens the shutter 29. In step S305, exposure of the image sensor 30 is executed.

In step S303, the aperture stop controller 19 closes the aperture stop 18 of the lens unit 1 up to a predetermined f-number.

In step S306, the shutter controller 43 closes the shutter 29 in accordance with a predetermined exposure time, thereby ending exposure of the image sensor 30.

In step S307, it is determined whether the set charge accumulation time has elapsed. If the set charge accumulation time has elapsed, charge accumulation in the image sensor 30 is ended in step S308. In step S309, the accumulated image signal is read out from the image sensor 30. The captured image data is sent from the A/D converter 31 to the memory control circuit 32 via the image processing circuit 36 or from the A/D converter 31 directly to the memory control circuit 32 and written in the main memory 34, and the process returns to the main routine (FIG. 3 or 4).

In step S310, the aperture stop 18 of the lens unit 1 is returned to the open state.

Figure 7:
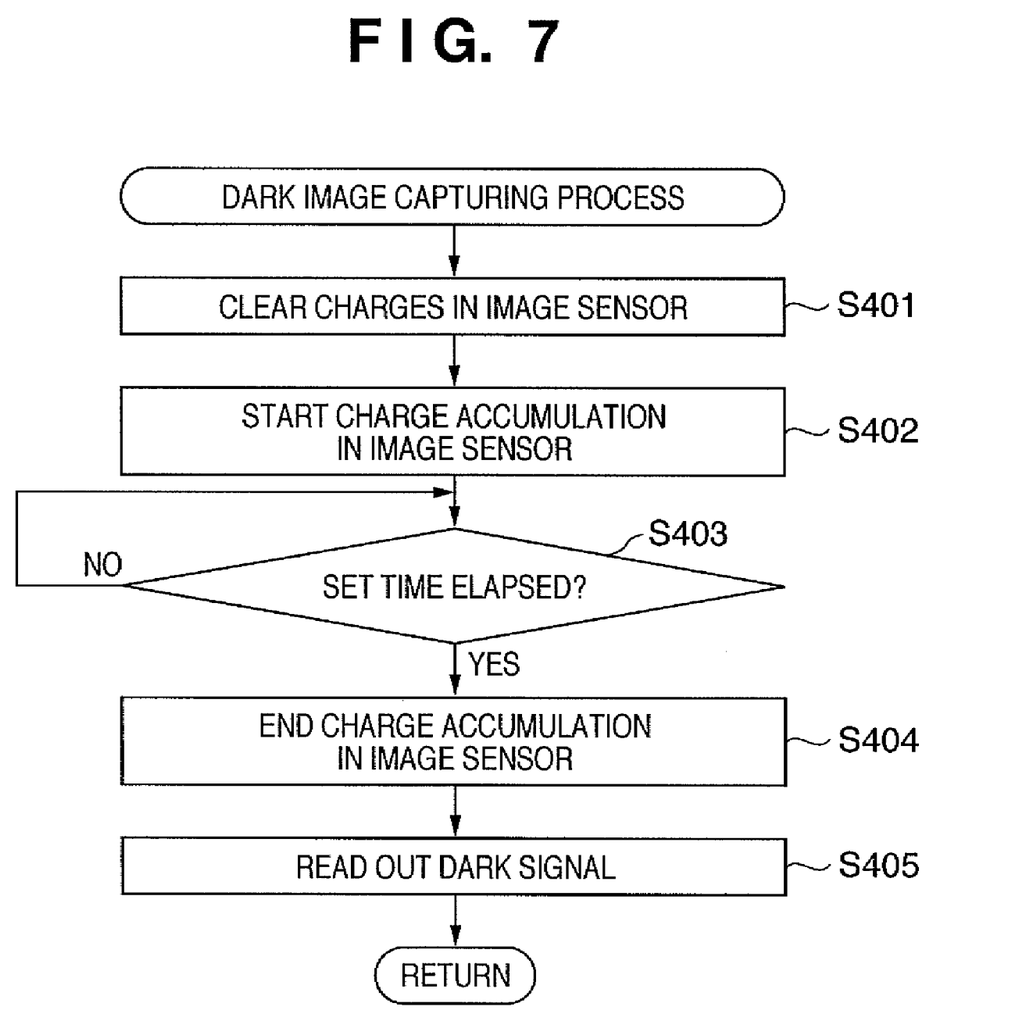
FIG. 7 is a flowchart illustrating the dark image capturing process routine of the digital camera according to the embodiment.

FIG. 7 is a flowchart illustrating the dark image capturing process routine executed in FIG. 3 or 4.

In step S401, charges accumulated in the image sensor 30 are cleared. In step S402, charge accumulation in the image sensor 30 starts while keeping the shutter 29 closed. In step S403, it is determined whether a set predetermined charge accumulation time has elapsed. If the predetermined charge accumulation time has elapsed, the process advances to step S404 to end charge accumulation in the image sensor 30. Normally, charge accumulation is done for a time equal to that in the shooting process. Then, in step S405, dark image data is read out from the image sensor 30. The dark image data is sent from the A/D converter 31 to the memory control circuit 32 via the image processing circuit 36 or from the A/D converter 31 directly to the memory control circuit 32 and written in the main memory 34, and the process returns to the main routine (FIG. 3 or 4).

A development process is performed using the dark noise correction data (dark image data). It is therefore possible to correct captured image data which degrades due to dark current noise generated in the image sensor 20 or pixel defects generated by small flaws in the image sensor 30.

The present invention is not limited to the above embodiment. In the above embodiment, the charge accumulation time in the shooting process equals that in the dark image capturing process. However, the charge accumulation time may be changed within a range that ensures acquisition of sufficient data for correction of dark current noise or the like.

When the shooting time is 1 sec or more, the aperture stop of the lens is closed up to f11. However, the shooting time and f-number of the lens are not limited to these.

It is not possible to perform the shooting operation during the dark image capturing process (step S123 or S163). To notify the user of it, the display unit 48 or image display unit 39 may output an image or sound indicating the busy state of the main body 102.

The recording medium attached to the first or second recording unit 6 or 7 is not limited to a hard disk or a memory card such as a PC card or Compact Flash®. For example, a micro DAT, a magneto-optical disk, an optical disk such as a CD-R or CD-WR, or a phase-change optical disk such as a DVD may be used. A composite recording medium that integrates, e.g., a memory card and hard disk may be attached to the first or second recording unit 6 or 7. The composite recording medium may be partially detachable.

In the above embodiment, the first and second recording units 6 and 7 are detachably attached to the main body 102. However, at least one of them may be integrated with the main body 102.

In the above embodiment, the image processing circuit 36 executes a predetermined arithmetic process using captured image data as needed. The system control circuit 40 controls the shutter controller 43, distance measuring unit 41, and the like to execute the AF process, AE process, and EF process of TTL scheme on the basis of the obtained arithmetic result. As an alternative, the distance measuring unit 41 and photometry unit 42 may execute the AF process, AE process, and EF process while the image processing circuit 36 does not execute the AF process, AE process, and EF process.

AF control may be done on the basis of the measurement result of the distance measuring unit 41, captured image data obtained by the image sensor 30, and the arithmetic result obtained by the image processing circuit 36. AE control may be done on the basis of the measurement result of the photometry unit 42, captured image data obtained by the image sensor 30, and the arithmetic result obtained by the image processing circuit 36.

The image processing circuit 36 may process image data captured by the image sensor 30, and the system control circuit 40 may control the shutter controller 43, aperture stop controller 19, and distance measurement controller 20 on the basis of the arithmetic result of the image processing circuit 36. That is, AE control and AF control can be done by using the video TTL scheme.

As described above, according to the above embodiment, it is possible to capture an accurate dark image even when the quick return mirror is moved up in dark image capturing.

Other Embodiments

The invention can also be achieved by the following method. A storage medium (or recording medium) which records software program codes to implement the functions of the above-described embodiment is supplied to a system or apparatus. The computer (or CPU or MPU) of the system or apparatus reads out and executes the program codes stored in the storage medium. In this case, the program codes read out from the storage medium themselves implement the functions of the above-described embodiment. The storage medium that stores the program codes constitutes the present invention. The functions of the above-described embodiment are implemented not only by causing the computer to execute the readout program codes. The present invention also incorporates the following arrangement. The operating system (OS) running on the computer partially or wholly executes actual processing on the basis of the instructions of the program codes, thereby implementing the functions of the above-described embodiment.

The present invention also incorporates the following arrangement. The program codes read out from the storage medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiment.

The storage medium to which the present invention is applied stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-006417, filed Jan. 15, 2007 which is hereby incorporated by reference herein in its entirety.

What is claimed is:

1. An image capturing apparatus comprising:
an image sensor;
a shutter, arranged between an objective lens and the image sensor, and openable to set the image sensor into an exposure enable state in which the image sensor can perform photoelectric conversion of an object image formed thereon, and closeable to set the image sensor into a light-shielding state;
a dark image acquisition unit operable to cause the image sensor to accumulate charges when the shutter closes to set the image sensor into the light shielding-state to acquire a dark image;
a controller operable, if an aperture size of an aperture stop is greater than a predetermined aperture size before the dark image is acquired, to control the aperture size of the aperture stop to be not greater than the predetermined aperture size during dark image acquisition; and an image processing unit operable to subtract the dark image from an image obtained by causing the image sensor to accumulate charges when the shutter opens to set the image sensor into the exposure enable state.

2. The apparatus according to claim 1, further comprising a quick return mirror which is arranged on an optical path from the objective lens to the image sensor, the quick return mirror being movable to a position on the optical path and a position moved away from the optical path, wherein if the aperture stop has an aperture size greater than the predetermined aperture size before acquiring the dark image while the quick return mirror is moved away from the optical path, the dark image acquisition unit acquires the dark image while the controller controls the aperture stop to an aperture size not greater than the predetermined aperture size.

3. The apparatus according to claim 1, wherein if a time period in which the image sensor accumulates the charges for dark image acquisition is equal to or greater than a predetermined time period, the controller controls the aperture stop to an aperture size not greater than the predetermined aperture size.

4. An image capturing method comprising:

setting an image sensor, usable to carry out photoelectrical conversion of an object image formed thereon, into a light-shielding state by closing a shutter arranged between an objective lens and the image sensor;

acquiring a dark image by causing the image sensor to accumulate charges when the shutter closes to set the image sensor into the light-shielding state;

if an aperture size of an aperture stop arranged at the objective lens is greater than a predetermined aperture size, controlling the aperture size of the aperture stop to be not greater than the predetermined aperture size during dark image acquisition; and subtracting the dark image from an image obtained by causing the image sensor to accumulate charges when the shutter opens to set the image sensor into an exposure enable state.

5. The method according to claim 4 for controlling a camera, wherein a quick return mirror is arranged on an optical path from an objective lens to the image sensor and is movable to a position on the optical path and a position moved away from the optical path, such that, in the aperture stop controlling step, if the aperture stop has an aperture size greater than the predetermined aperture size before acquiring the dark image and the quick return mirror is away from the optical path, the aperture stop is controlled to an aperture size not greater than the predetermined aperture size.

6. The method according to claim 4, wherein if a time period in which the image sensor accumulates the charges for dark image acquisition is equal to or greater than a predetermined time period, the controlling controls the aperture stop to an aperture size not greater than the predetermined aperture size.

7. A computer-readable storage medium storing a program which when loaded into a computer and executed causes the computer to perform a method of:

setting an image sensor, usable to carry out photoelectrical conversion of an object image formed thereon, into a light-shielding state by closing a shutter arranged between an objective lens and the image sensor;

acquiring a dark image by causing the image sensor to accumulate charges when the shutter closes to set the image sensor into the light-shielding state;

if an aperture size of an aperture stop arranged at the objective lens is greater than a predetermined aperture size, controlling the aperture size of the aperture stop to be not greater than the predetermined aperture size during dark image acquisition; and subtracting the dark image from an image obtained by causing the image sensor to accumulate charges when the shutter opens to set the image sensor into an exposure enable state.

8. A computer readable storage medium storing a program as claimed in claim 7, for controlling a camera having a quick return mirror arranged on an optical path from an objective lens to the image sensor, the mirror being movable to a position on the optical path and a position moved away from the optical path, such that, in the aperture stop controlling step of the method, if the aperture stop has an aperture size greater than the predetermined aperture size before acquiring the dark image and the quick return mirror is away from the optical path, the aperture stop is controlled to an aperture size not greater than the predetermined aperture size.

9. The computer readable storage medium according to claim 7, wherein if a time period in which the image sensor accumulates the charges for dark image acquisition is equal to or greater than a predetermined time period, the controlling controls the aperture stop to an aperture size not greater than the predetermined aperture size.

* * * * *